United States Patent [19]

Tooley

[11] Patent Number: 5,252,814
[45] Date of Patent: Oct. 12, 1993

[54] MULTI-SCANNER CHECKOUT COUNTER USING DIGITIZER PANEL TO DETERMINE X-Y LOCATION OF SCANED ITEMS

[75] Inventor: Thomas P. Tooley, Alpharetta, Ga.
[73] Assignee: NCR Corporation, Dayton, Ohio
[21] Appl. No.: 930,963
[22] Filed: Aug. 17, 1992
[51] Int. Cl.$^5$ .............................................. G06K 7/10
[52] U.S. Cl. ................... 235/383; 235/436; 235/462; 186/61
[58] Field of Search ............. 235/383, 467, 462, 472, 235/437, 436; 358/488; 186/61; 178/18, 19

[56] References Cited

U.S. PATENT DOCUMENTS

| | | | |
|---|---|---|---|
| 4,393,410 | 7/1983 | Ridge et al. | 358/488 |
| 4,676,343 | 6/1987 | Humble et al. | 235/437 |
| 4,938,317 | 7/1990 | Kohno etal. | 186/61 |
| 5,019,714 | 5/1991 | Knowles | 235/467 |

Primary Examiner—Davis L. Willis
Assistant Examiner—Edward H. Sikorski
Attorney, Agent, or Firm—Richard W. Lavin

[57] ABSTRACT

An apparatus is disclosed for scanning a bar code label on purchased merchandise items, including a support member having a first conveyor belt mounted above a second conveyor belt, and a digitizer panel oriented in a downward direction positioned therebetween. The digitizer panel will track the X and Y locations of the merchandise items as they move down the face of the panel. A plurality of optical scanners are positioned above and below the digitizer panel for scanning a bar code label on a merchandise item moving across the digitizer. Processing means coupled to the digitizer and each of the scanners will detect the bar code label being read by each scanner when more than one merchandise item is located on the digitizer.

5 Claims, 4 Drawing Sheets

MULTI-SCANNER CHECKOUT COUNTER USING DIGITIZER PANEL TO DETERMINE X-Y LOCATION OF SCANED ITEMS

BACKGROUND OF THE INVENTION

The present invention is directed to a checkout scanning system and more particularly to a system for automatically reading bar code labels attached to merchandise items without the items being handled by the checkout operator.

In present day merchandise checkout systems, the use of optical scanners for scanning the Universal Product Code (UPC) labels on purchased merchandise items is quite common. In checkout systems used today, the optical scanner can take the form of a scanner mechanism located in a checkout counter or in the form of a hand-held optical scanner. In either case, the checkout operator will position the bar code label adjacent the scanner. The optical scanner will scan the bar code pattern which forms the UPC label and generate signals representing the bars and spaces of the pattern for transmission to a processing apparatus which determines the character represented by the bar code pattern. The positioning of the merchandise item adjacent the scanner requiring manual intervention by the operator takes time especially when several scanning passes are required to obtain a good read of the bar code label. It would be desirable to provide a scanning system which insures that the bar code label will be scanned automatically irrespective of the position of the bar code label to increase the speed of the checkout operation.

It is therefore a principal object of this invention to provide a checkout system which will scan a bar code label on a purchased merchandise item without requiring the checkout operator to handle either the scanning system or the merchandise item during a scanning operation.

It is another object of this invention to provide a checkout system employing a plurality of bar code scanning apparatuses for scanning a bar code label attached to a merchandise item allowing the scanning apparatuses to scan the bar code label without the checkout operator handling the merchandise item during the scanning operation.

SUMMARY OF THE INVENTION

A merchandise item checkout system includes a checkout counter having a front portion including a conveyer belt on which is placed purchased merchandise items prior to a checkout operation. The checkout counter further includes a rear portion which comprises a second conveyer belt located at a level below the first conveyer belt for conveying purchased merchandise items to an operator station located adjacent the end of the checkout counter where a data terminal device is located. Mounted between the front and rear portion of the checkout counter is a digitizer oriented in a generally downward direction and positioned adjacent the rear end of the first conveyer belt and the front end of the second conveyer belt. Mounted adjacent the digitizer and oriented to project scanning light beams at various angles to the surface of the digitizer are a plurality of optical scanner apparatuses mounted adjacent the upper and lower surface of the digitizer for scanning a merchandise item located on the digitizer as the item tumbles down the surface of the digitizer from the end of the first conveyer belt towards the second conveyer belt and the rear portion of the checkout counter. The optical scanner apparatuses and the digitizer are coupled to a microprocessor. In response to receiving signals from the scanner apparatuses and the digitizer, the microprocessor will match the readings of the UPC label generated by an optical scanner apparatus whose position at any one time is determined by the signals generated by the digitizer.

BRIEF DESCRIPTION OF THE DRAWINGS

Additional advantages and meritorious features of the present invention will become more apparent and fully understood from a reading of the following detailed description and appended claims when read in conjunction with the drawings wherein like reference numerals indicate like or corresponding elements throughout the several views and wherein:.

DESCRIPTION OF THE PREFERRED EMBODIMENT

Figure 1:
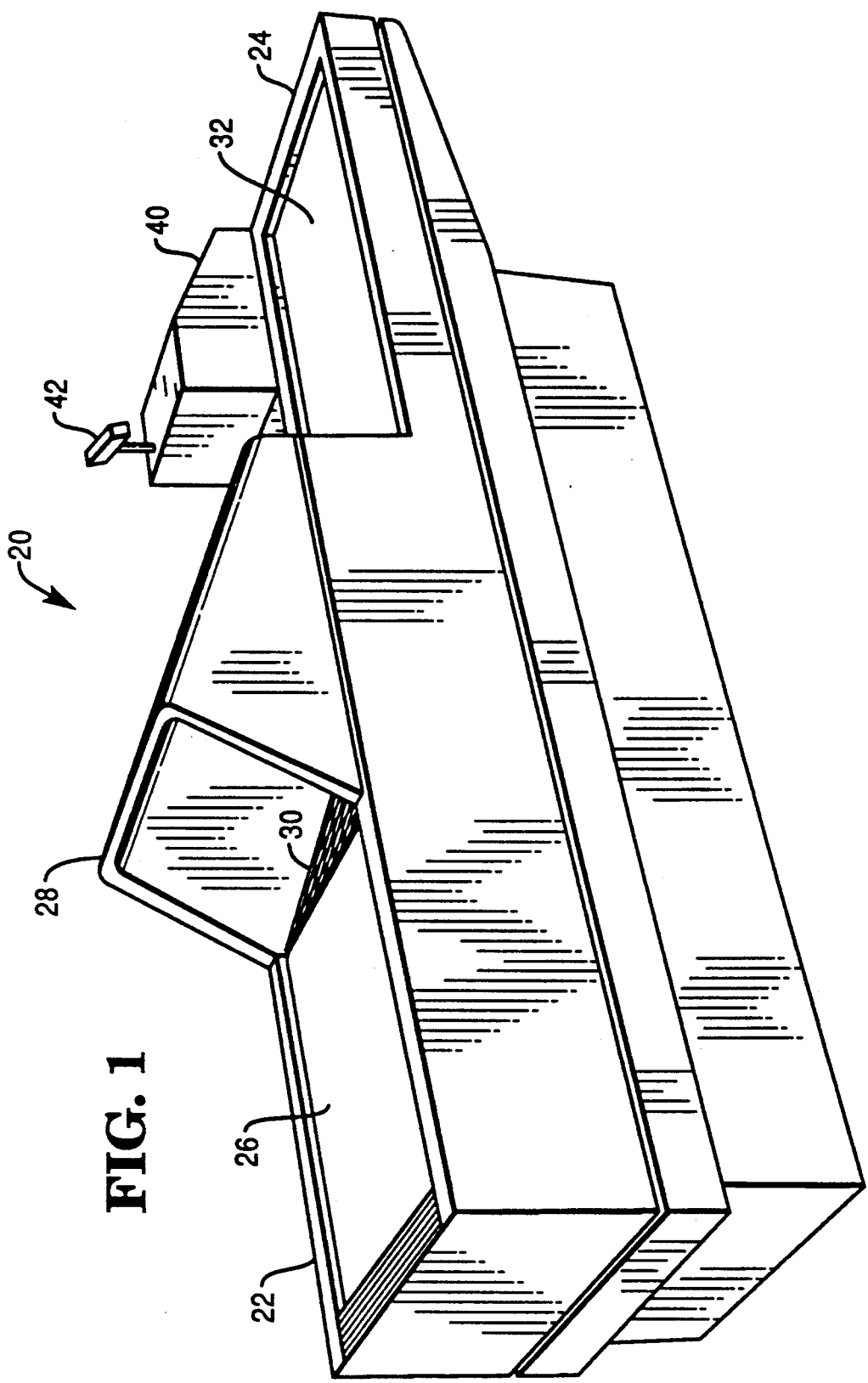
FIG. 1 is a perspective view of the checkout counter showing the location of the conveyer belts together with a data terminal device located at the checkout operator's station.

Referring now to FIG. 1, there is shown a perspective view of the checkout counter incorporating the present invention. The checkout counter, generally indicated by the numeral 20, includes a front horizontal portion 22 and a rear horizontal portion 24 which is located below the front portion 22. Mounted in the front portion 22 is a conveyer belt 26, one end of which is located adjacent a hood member 28. Located within the hood member is a digitizer panel 30 (FIG. 2) which is oriented in a downward direction to a position adjacent one end of a second conveyer belt 32 located in the rear portion 24 of the checkout counter 20.

Figure 2:
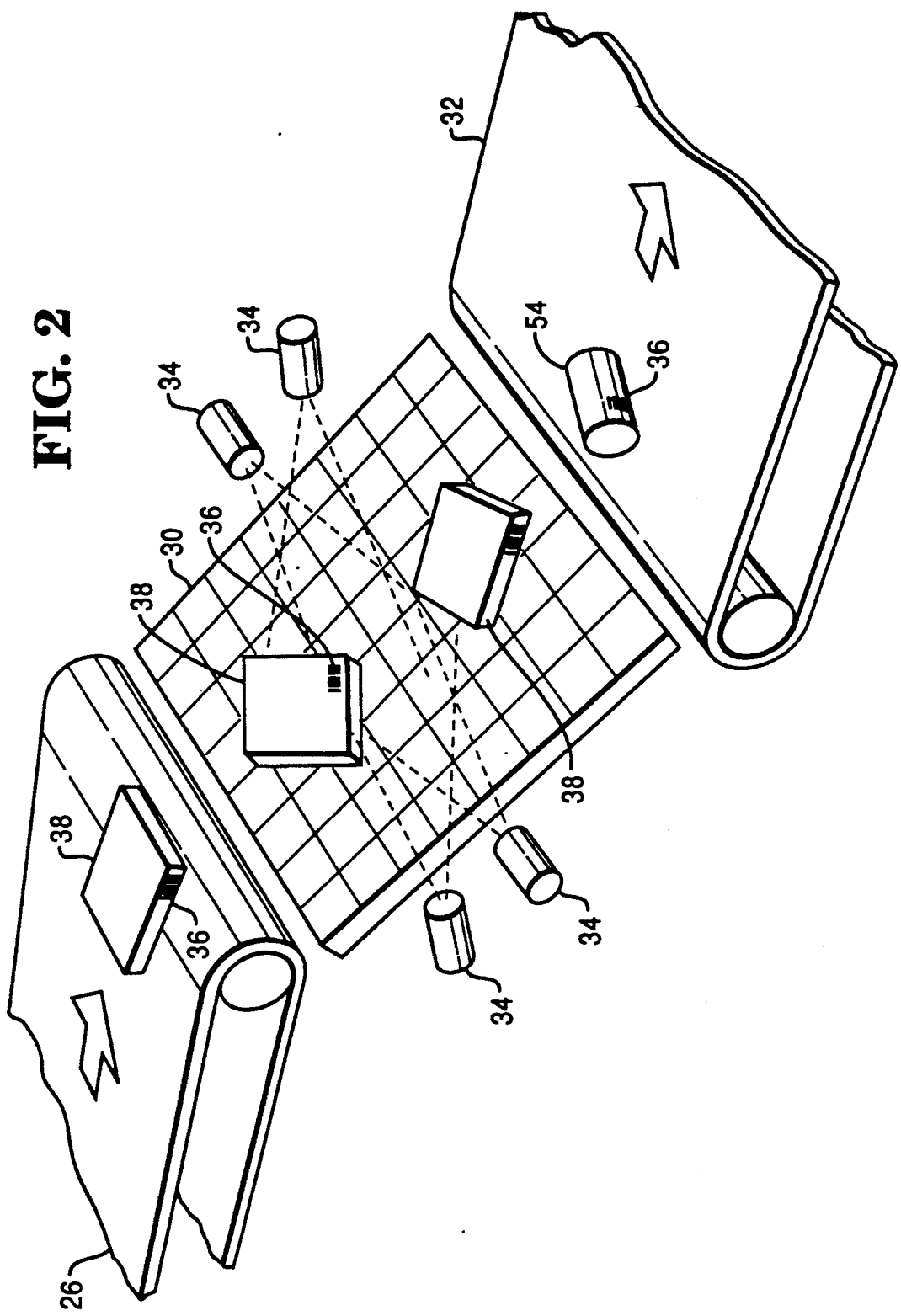
FIG. 2 is a perspective view of the digitizer together with the conveyer belts showing the location of a plurality of optical scanner apparatuses for simultaneously scanning a number of merchandise items which are shown tumbling down the face of the digitizer.
Figure 3:
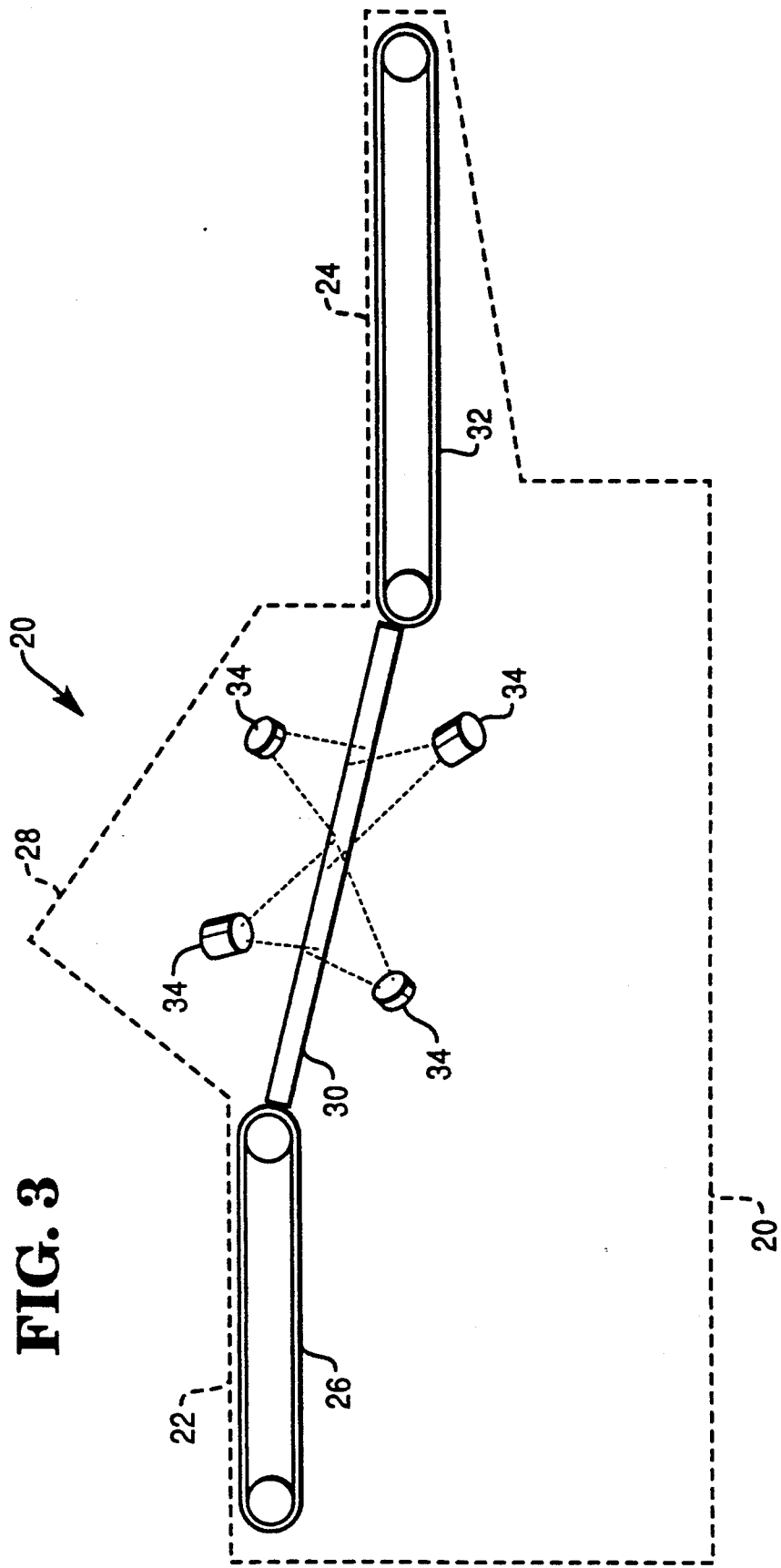
FIG. 3 is a side view of the optical checkout system including the digitizer, the optical scanner apparatuses and the two conveyer belts.

As best seen from FIGS. 2 and 3, mounted adjacent the digitizer panel 30 are a number of optical scanner apparatuses 34 which project scanning light beams at various areas on the digitizer panel 30 for scanning a bar code label 36 positioned on a merchandise item 38. As best seen from FIG. 2, the bar code label 36 may be positioned on any surface of the merchandise item 38. Since the digitizer panel 30 is transparent, a number of optical scanner apparatuses 34 may be positioned below the digitizer panel for projecting scanning light beams through the digitizer panel to read a bar code label positioned on the top portion of the digitizer panel. As shown in FIG. 1, located adjacent the rear portion 24 of the checkout counter 20 comprising an operator's station is a data terminal device 40 which includes a display device 42.

In the operation of the checkout system, the customer will position on the conveyer belt 26 a purchased merchandise item 38 on which is located a bar code label 36 identifying the merchandise item. Movement of the conveyer belt 26 will deliver the merchandise item onto the digitizer panel 30. Since the digitizer panel 30 is mounted at a angle to the surface of the conveyer belt 26, the merchandise item will tumble down the digitizer panel 30 towards the second conveyer belt 32 from where it will be delivered to the checkout operator positioned at the operator's station adjacent the rear portion 24 of the checkout counter and the data terminal device 40. As the merchandise item 38 moves across the digitizer panel 30, the bar code label 36 may be read by one or more of the optical scanner apparatuses 34. The signals generated by the digitizer panel representing at any one time the location of the merchandise item 38 and the bar code label 36 are used to determine which bar code scanner apparatus 34 is scanning the bar code label at that time. This information will be transmitted to the data terminal device 40 which will determine the price of the item which is then displayed in the display 42.

Figure 4:
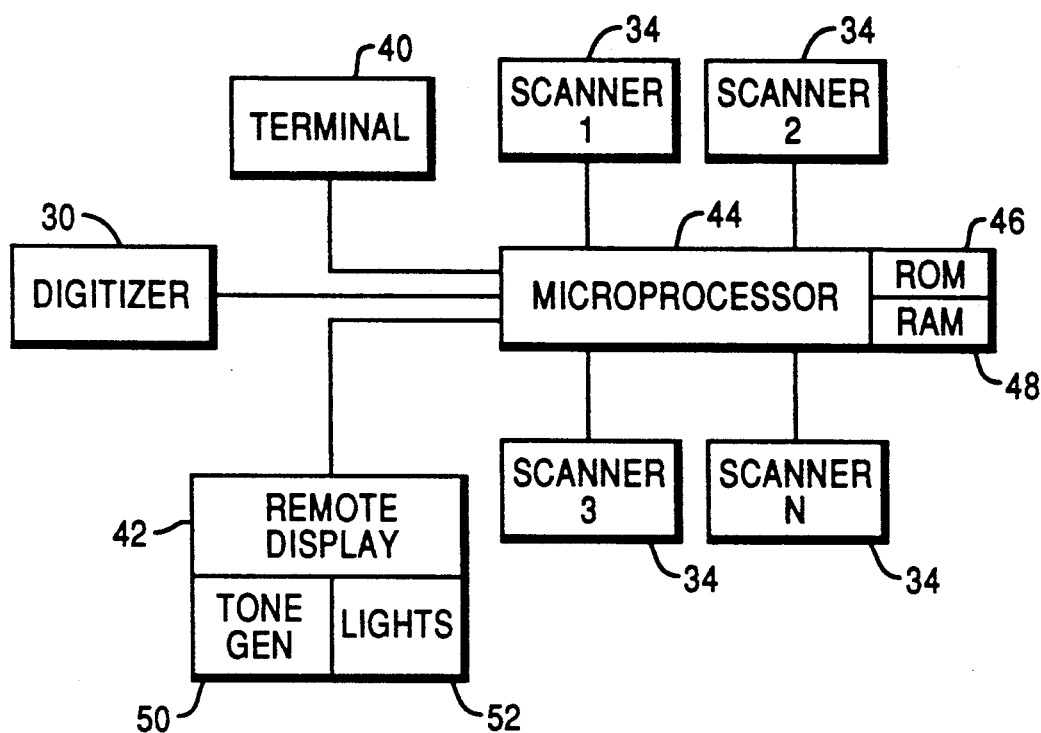
FIG. 4 is a block diagram of the processing system for generating data representing coded data of the bar code label.

Referring now to FIG. 4 there is shown a block diagram of the processing system associated with the present invention which includes a microprocessor 44 coupled to the terminal 40, the optical scanning apparatuses 34, the digitizer panel 30 and the remote display 42. The remote display 42 may include a tone generator 50 which, upon the successful reading of a bar code label, will generate a tone indicating a valid read operation. Also included in the remote display are lights 52 which may be operated to signify a similar accomplishment. The microprocessor 44, in response to receiving the signals from the scanner apparatuses 34 representing the data scanned on the bar code label and the digitizer panel 30 representing locational data, will generate digital signals representing the bar code data scanned by the scanner apparatuses 34. This information may be either transmitted to a remote processor (not shown) which, using the data, will identify the merchandise item and its price which is then transmitted back to the microprocessor which operates the display 42 to display this information, or may be stored in a RAM unit 48 in the microprocessor 44.

The digitizer panel 30 is of conventional construction which includes a capacitive or IR sensing overlay to determine the x and y location of a merchandise item on the digitizer panel. As the merchandise item falls down the panel due to gravity, the merchandise item will either provide a rolling or sliding notion depending on the shape of the merchandise item. As the merchandise item moves down the digitizer panel, the bar code label on the merchandise item will expose itself to one or more of the optical scanners 34. The digitizer panel will track the merchandise items as they move along the face of the digitizer panel and generate signals representing such locations in a manner that is well known in the art. The microprocessor 44 will use this information to identify the optical scanner apparatus scanning the bar code label at that time. Where there is occurring multiple reads on the same object or a number of bar code labels are being read by the same scanner, such locational information can generate valid read operations. In the case where a merchandise item is in the form of a jar 54, (FIG. 2), oppositely located optical scanners apparatuses 34 will generate data indicating alternating valid scan operations. As such, software located in a Ram unit 48 located in the microprocessor 44 will use this information in conjunction with the signals generated by the digitizer panel 30 representing the x and y location of the merchandise item at the time the merchandise item moves through the scan pattern of a particular scanning apparatus 34 to track the merchandise item as it proceeds down the face of the digitizer panel 30.

It will be seen that scanning merchandise items in the manner described by the present invention eliminates the need for manual intervention by the checkout operator in the checkout process. The customer merely places the purchased merchandise items on the conveyer belt 26 allowing the merchandise items to move across the digitizer panel 30 and onto the conveyer belt 32 which delivers the merchandise items to the checkout operator standing at the end of the checkout counter 20 with each of the merchandise items having been scanned and the data generated indicating the price of the merchandise item. The checkout operator will then bag the purchased merchandise item.

An alternate arrangement would be to use an array of mirrors and one optical scanner to gain the same effective automatic scanning operation. In this arrangement, the laser intensity of the scanner could be significantly increased since the system is completely shrouded from the operator. Another arrangement would be to use a laser itself to determine the position in tracking of the merchandise item on the digitizer.

While the salient features of the invention have been illustrated and described, it should be readily apparent to those skilled in the art that many changes and modifications can be made in the invention presented without departing from the spirit and true scope of the invention. Accordingly, the present invention should be considered as encompassing all such changes and modifications of the invention that fall within the broad scope of the invention as defined by the claims.

What is claimed is:

1. An apparatus for scanning bar code indicia comprising:
    a support member having a front supporting surface and a rear supporting surface for supporting a merchandise item having bar code indicia located thereon;
    a digitizer mounted between the front supporting surface and the rear supporting surface for generating first signals representing the location of a merchandise item on the surface of the digitizer, said digitizer oriented in a slanted position so that a merchandise item positioned on the surface of the digitizer will move across the digitizer to a position on the rear supporting surface;
    an optical bar code reader positioned adjacent the digitizer for projecting scanning light beams along the surface of the digitizer for scanning a bar code label positioned on a merchandise item located on the digitizer, said bar code reader generating second signals representing the data contained in the bar code label; and
    processing means coupled to said bar code reader and said digitizer for identifying the bar code label being scanned by the bar code reader when more than one merchandise item is located on the digitizer at the same time.

2. The apparatus of claim 1 in which said first and second supporting surfaces comprise first and second conveyer means for transporting a merchandise item positioned on the conveyer means.

3. The apparatus of claim 2 in which said digitizer is mounted in a downward direction enabling a merchandise item positioned on the digitizer to move from the first conveyer means across the digitizer by the force of gravity to be deposited on the second conveyer means.

4. The apparatus of claim 1 which further includes more than one bar code reader for projecting scanning light beams at the surface of the digitizer.

5. The apparatus of claim 4 in which the digitizer is transparent, said apparatus including bar code readers positioned above and below the digitizer for projecting scanning light beams at a bar code label positioned on the top surface of the digitizer.

* * * * *